United States Patent
Kautz

(10) Patent No.: US 9,656,552 B2
(45) Date of Patent: May 23, 2017

(54) ELECTRIFIED VEHICLE NOISE CANCELLATION

(71) Applicant: Ford Global Technologies, LLC, Dearborn, MI (US)

(72) Inventor: Richard William Kautz, North Branch, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 261 days.

(21) Appl. No.: 14/533,889

(22) Filed: Nov. 5, 2014

(65) Prior Publication Data

US 2016/0125868 A1    May 5, 2016

(51) Int. Cl.
| | | |
|---|---|---|
| *A61F 11/06* | (2006.01) |
| *G10K 11/16* | (2006.01) |
| *H03B 29/00* | (2006.01) |
| *B60L 3/00* | (2006.01) |

(52) U.S. Cl.
CPC ..................................... *B60L 3/00* (2013.01)

(58) Field of Classification Search
CPC .. B60L 3/00; B60L 2270/142; B60L 2270/42; G10K 2210/1282; G10K 2210/128; G10K 2210/12821; G10K 11/175; G10K 2210/3027
USPC .................... 381/71.4, 71.1, 71.2, 71.3, 71.8
See application file for complete search history.

(56) References Cited

U.S. PATENT DOCUMENTS

| | | |
|---|---|---|
| 7,413,041 B2 | 8/2008 | Drosendahl et al. |
| 8,045,725 B2 | 10/2011 | Theobald et al. |
| 2010/0124336 A1* | 5/2010 | Shridhar ............ G10K 11/1782 381/71.4 |

FOREIGN PATENT DOCUMENTS

EP        2329993 A1      6/2011

* cited by examiner

*Primary Examiner* — Paul S Kim
(74) *Attorney, Agent, or Firm* — Maristyn Law LLC; Lynda F. Kouroupis; David B. Kelley

(57) ABSTRACT

Systems, apparatus and methods for cancelling a noise voltage at a vehicle are presented. An noise cancellation system (NCS) can be configured to null an earth-to-body voltage at the vehicle to prevent its interference with a receiver system. An (NCS) can include a noise sensor (NSSR) configured to sense a noise voltage, and a noise-nulling device (NNDV) configured to provide an anti-noise output. An anti-noise injector (ANI) can be configured to drive the anti-noise output at an anti-noise injection site In an example embodiment, an anti-noise output can be provided directly to the receiver system by cable. Alternatively, an anti-noise signal can be inductively or capacitively coupled to a vehicle structure or component that is not part of the receiver system. A noise cancellation system can be arranged in a feedback or feed-forward arrangement. Radio frequency noise and non-radio frequency noise can be cancelled.

18 Claims, 13 Drawing Sheets

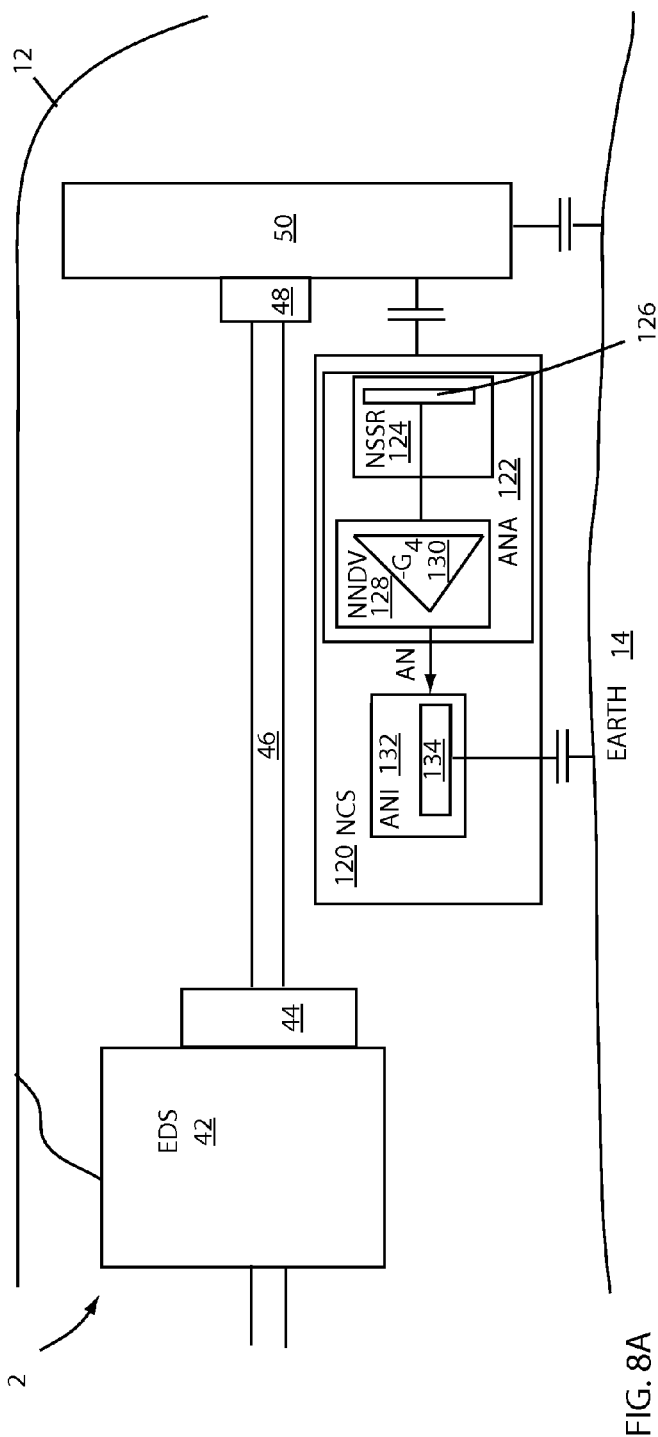
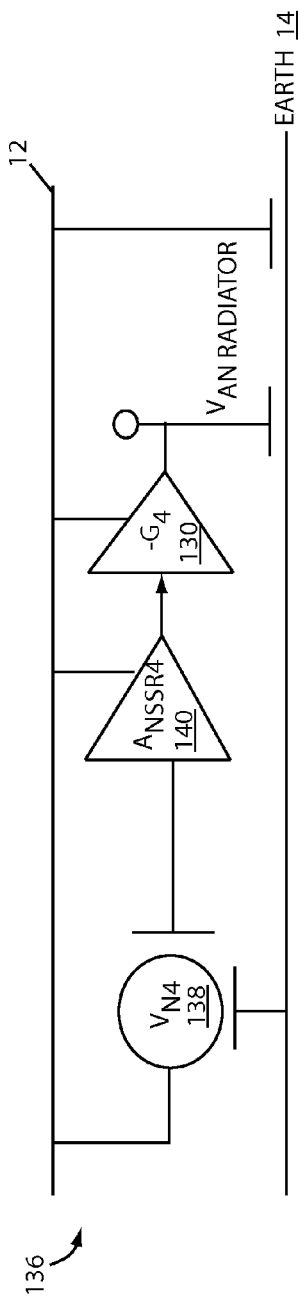
FIG. 8A
FIG. 8B

ELECTRIFIED VEHICLE NOISE CANCELLATION

FIELD OF INVENTION

This invention relates generally to noise cancellation, and more particularly to the cancellation of a noise voltage at a vehicle to in order to reduce interference at an onboard receiver.

BACKGROUND OF INVENTION

Electrified vehicles (EVs) reduce carbon emissions and fuel costs by providing an electric propulsion system that can either assist, as in the case of a hybrid electric vehicle, or replace, as in the case of an all-electric vehicle, a gasoline-powered combustion engine. However, its power electronic devices generate large noise voltages, a portion of which can propagate through an EV transaxle and appear externally on a half-shaft, wheels or other vehicle structures that have a capacitance to earth. When such noise propagation occurs, a portion of the noise voltage can be induced on the vehicle body, and interfere with radio reception at the vehicle. A vehicle radio antenna is designed to detect the voltage difference between its ground reference, which is typically the vehicle body, and the surrounding external environment. A voltage on the vehicle body will be detected by the antenna and provided to the radio receiver. As a result, a radio listener may hear static, whistles and/or ringing sounds that can vary in pitch. Unfortunately, this type of radio interference can be difficult to mitigate by conventional means.

A previous attempt to prevent shaft-coupled interference at a radio receiver of an electrified vehicle included the installation of brushes to ground the half-shaft to a motor case. However, because brush installation requires space in the transaxle for the brushes, and the addition of a removable cover with gaskets to allow access for maintenance, it fails to provide a simple, low-cost interference mitigation solution.

SUMMARY OF THE INVENTION

A noise cancellation system (NCS) is configured to null an earth-to-body voltage at a vehicle. By way of example, an NCS can be configured to sense a noise voltage at a vehicle structure and provide an anti-noise output configured to prevent or mitigate interference at a receiver system due to an earth-to-body voltage. By way of example, an NCS can be configured to cancel shaft-coupled radio frequency (RF) noise at an electrified vehicle (EV) body. A noise voltage can be detected at a noise detection site at the vehicle, and an anti-noise waveform can be coupled to the vehicle at an anti-noise injection site that can be remote from the noise detection site. In an example embodiment, an NCS can be configured in a feedback control arrangement, with an anti-noise output provided as a feedback signal. In a further embodiment, an NCS can be configured in a feed-forward control arrangement with an anti-noise output provided as a feed-forward signal.

An example NCS can include an anti-noise assembly (ANA), comprising active and/or passive devices, configured to provide an anti-noise output to an anti-noise injector (ANI). In an example embodiment, an ANA can include a passive noise sensor (NSSR) to detect a noise voltage, and an active noise-nulling device (NNDV) configured to provide an anti-noise output to the ANI. The anti-noise output can be in the form of a cancellation waveform configured to cancel a detected noise voltage. The ANI can be configured to couple the anti-noise output to a vehicle structure, apparatus or onboard receiver system to effect the noise nulling or cancellation.

An example method can include sensing a noise voltage at a vehicle, and in response, providing an anti-noise waveform. A method can include providing an anti-noise waveform in a feedback or feed forward arrangement in order to null an earth-to-body voltage. A method can further include coupling the anti-noise waveform to an apparatus at the vehicle. By way of example, a method can include capacitive sensing of a noise voltage, and capacitive or inductive coupling of an anti-noise waveform to the vehicle. An exemplary method can include detecting an earth-to-body noise voltage at a noise detection site, inverting the detected noise voltage, applying a gain in accordance with a feedback or feed-forward control topology, and injecting an anti-noise output at an injection site at the vehicle.

BRIEF DESCRIPTION OF THE DRAWINGS

FIG. 8A shows an example feed-forward noise cancellation system.

FIG. 8B shows an example circuit for the feed-forward system of FIG. 8A.

DETAILED DESCRIPTION OF EXAMPLE EMBODIMENTS

Example embodiments of the invention are presented herein; however, the invention may be embodied in a variety of alternative forms, as will be apparent to those skilled in the art. To facilitate understanding of the invention, and provide a basis for the claims, various figures are included in the specification. The figures are not drawn to scale and related elements may be omitted so as to emphasize novel features of the invention. Structural and functional details depicted in the figures are provided for the purpose of teaching the practice of the invention to those skilled in the art and are not to be interpreted as limitations. Furthermore, while shown in the environment of an electric vehicle, it will be understood by those skilled in the art that the invention can be used in alternative contexts and environments to cancel various types of noise voltages associated with operation of an electric apparatus or machine.

Figure 1:
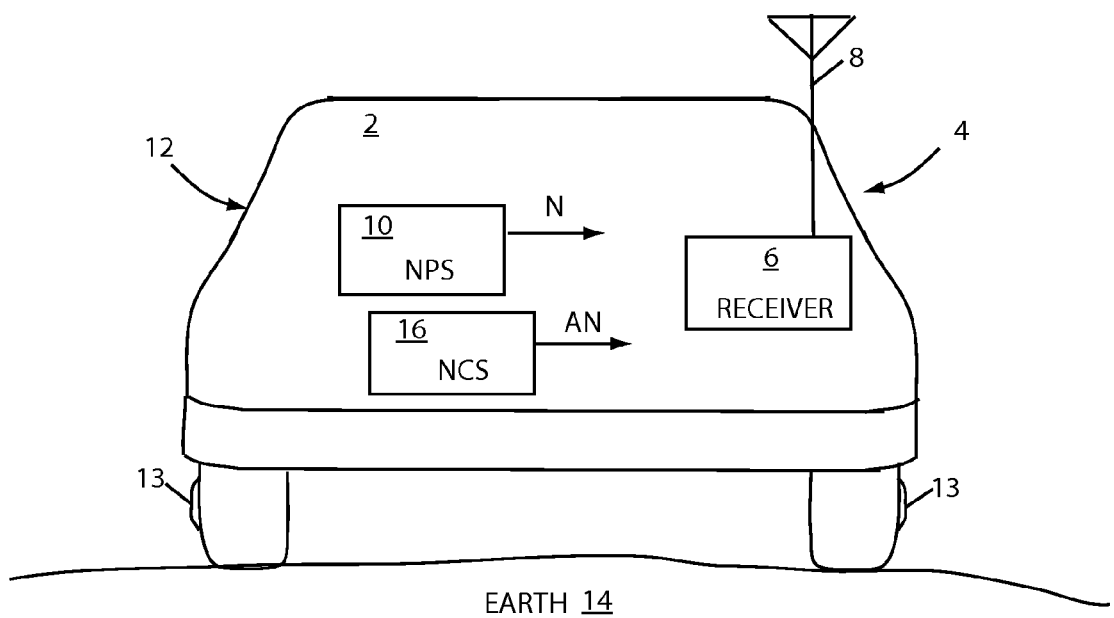
FIG. 1 shows an example environment for a noise cancellation system.

Turning first to the Drawings, in which like reference numerals refer to like elements throughout the several views, FIG. 1 depicts an electrified vehicle (EV) 2 equipped with a radio receiver system 4 that includes a receiver 6 electrically coupled to an antenna 8. Noise generated and propagated by a noise propagation system (NPS) 10 at the EV 2 can be coupled to the vehicle body 12. Left unmitigated, the noise voltage N can alter the electric potential of the vehicle with respect to earth potential 14 and excite the antenna 8 with the resulting electric field. Via the antenna 8, the noise N can be provided to the receiver 6 where it can interfere with reception of desired RF signals. To avoid such interference, the vehicle 2 is equipped with a noise cancellation system (NCS) 16 configured to provide an anti-noise waveform (AN). By way of example, the waveform AN can be configured to null an earth-to-body voltage at the vehicle 2 caused by a difference in potential between the vehicle body 12 and a noise radiator at the vehicle 2, such as a wheel 13. In an example embodiment, the NCS 16 can be configured to invert a detected noise waveform to provide an anti-noise signal that cancels the detected noise waveform.

Figure 2:
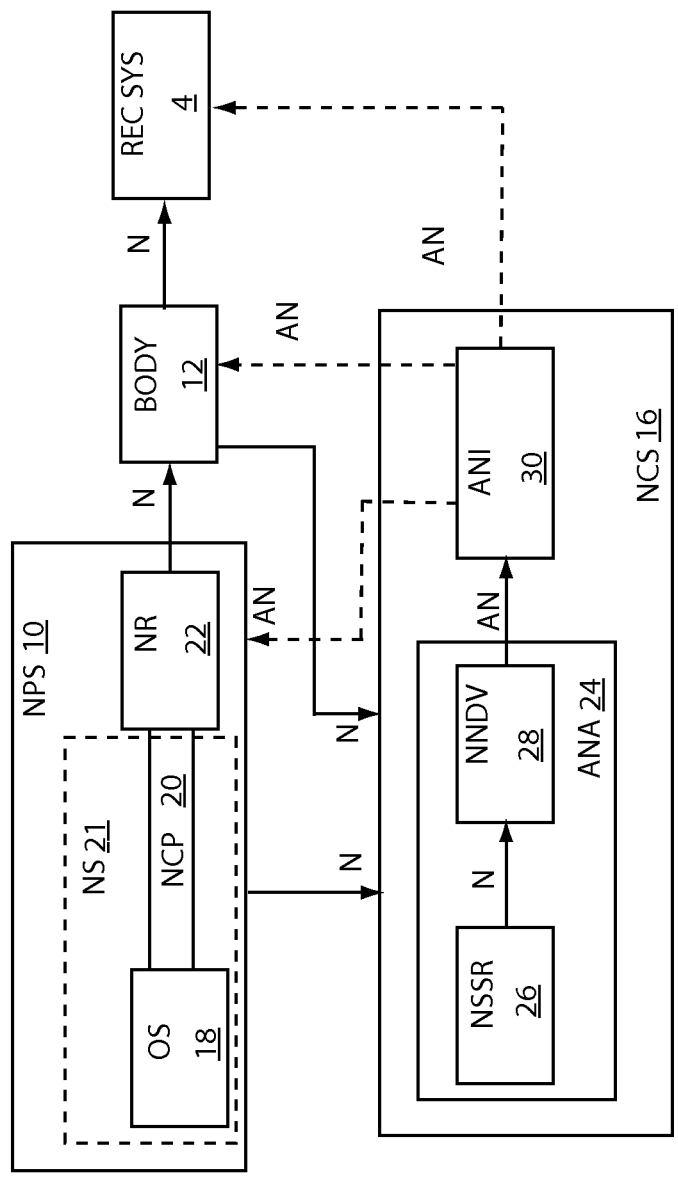
FIG. 2 shows an example configuration of a noise cancellation system.

FIG. 2 provides an example embodiment of the NCS 16 and illustrates the manner in which it can counteract noise, such as, but not limited to RF noise, to mitigate interference at the receiver 6. For illustrative purposes, the NPS 10 can be considered as an electrically coupled arrangement of an originating source (OS) 18 coupled to a noise radiator (NR) 22 by a noise conduction path (NCP) 20. In the context of an electrified vehicle, the originating source (OS) 18 for an RF noise voltage is generally the electric drive system (EDS). More particularly, the OS 18 for an RF noise voltage is typically the EDS inverter power electronics (not shown) which are driven with PWM switching signals to provide a three-phase current to an electric machine such as an electric motor. The NCP 20 can include vehicle component(s) that facilitate conduction and propagation of the noise voltage away from its originating source. For example, inverter-generated noise can be coupled onto the rotor from the windings of a vehicle's electric motor, then conductively pass across the vehicle's gears and shafts to the vehicle's wheels. Accordingly, the NCP 20 can include components of an electric drive system for the EV 2, such as, but not limited to a motor, motor bearing, and a transaxle (not shown). The NR 22 can couple a noise voltage received via the NCP 20 to the vehicle body 12 where it can be detected by the radio receiver system 4. For example, the NR 22 can be a half-shaft (not shown) or the wheel 13 (see FIG. 1) of the EV 2. It is contemplated that a noise voltage originating at the OS 18 can be attenuated as it propagates over the NCP 20 to the NR 22. For discussion purposes herein, the term "noise source" (NS) can be used to refer to an originating source and any non-radiating component along a noise conduction path between an originating source and a noise radiator. For example, the NS 21 can include the OS 18 and the NCP 20. In an example embodiment, the NCS 16 can be configured to sense a voltage N between the earth potential 14 and the vehicle body 12, and provide an AN output to cancel it.

Various embodiments of an NCS can be practiced to prevent interference at an EV 2 radio receiver 6 that can be caused by the radiated noise signal N. For illustrative purposes, FIG. 2 depicts the ability to sense a noise voltage radiated by the NPS 10 or NR 22, and to drive or couple an anti-noise output at various sites at a vehicle. By way of example, but not limitation, as shown by the dashed arrows in FIG. 2, an NCS can be configured to drive an anti-noise signal AN at the NPS 10, the vehicle body 12 or at the receiver system 4. As indicated in FIG. 2, the vehicle body 12 can function as noise radiator, providing a noise voltage N, and can also serve as a possible anti-noise injection site. While discussed herein in terms of an NCS to cancel shaft-coupled RF noise at an electrified vehicle, it is understood that an NCS can be configured to cancel other types of noise, including noise signals at frequencies other than RF, noise signals that are not shaft-coupled, and noise signals at non-electrified vehicles. An NCS can be deployed at various platforms in various environments including non-electrified vehicles, and can be used in consumer, commercial, and military applications. It is contemplated that in various applications an NCS can be configured to drive a cancellation or anti-noise signal at a noise source, for example the NS 21.

In an example embodiment, NCS 16 can include an anti-noise assembly (ANA) 24 configured to provide an anti-noise waveform AN; and an anti-noise injector (ANI) 30 configured to receive AN and couple it to a vehicle apparatus or structure. In an example embodiment, the ANA 24 can include a noise sensor (NSSR) 26, configured to sense a noise voltage at the EV 2. The NSSR 26 can be electrically coupled to a noise-nulling device (NNDV) 28 configured to provide an anti-noise output for noise cancellation. It is contemplated that both the NSSR 26 and the NNDV 28 can comprise active and/or passive devices. In the context of an electrified vehicle in which RF noise can propagate over a rotating electric motor, it is often preferred that the NSSR 26 be embodied as a passive device, such as a capacitive sensor. When used in conjunction with a capacitive sensor, it is generally preferred that the NNDV 28 comprise a high input impedance device, such as a buffer or other type of amplifier. The ANI 30 can also comprise passive and/or active components. In an example embodiment, the ANI 30 is embodied as an inductive or capacitive coupler configured to couple the anti-noise signal to a structure of the EV 2. As will be discussed in greater detail subsequently herein, the AN signal provided by the ANA 24 to the ANI 30 may experience loss or attenuation as a result of the coupling performed by an ANI. It is contemplated that anticipated losses caused by NCS components can be considered when determining an appropriate gain for an NNDV amplifier, so that an NNDV can be configured to provide an AN output that effectively cancels a sensed noise voltage. For illustrative purposes, the output provided by an ANI is shown as the same output provided by an NNDV, with no distinction made for possible ANI loss.

Figure 3:
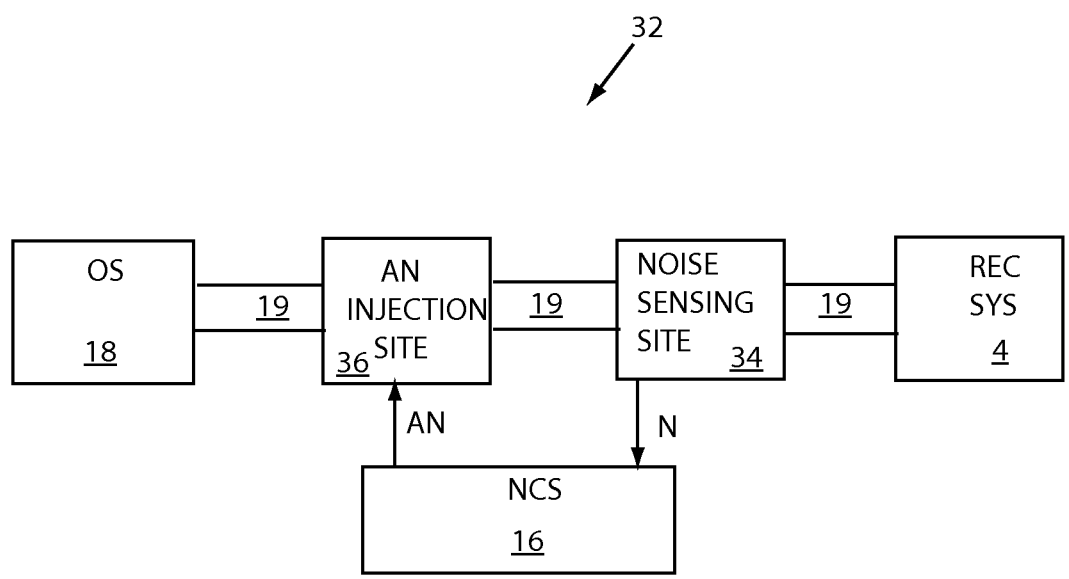
FIG. 3 shows an example feedback topology for a noise cancellation system.

An NCS can be variously configured, for example, an NCS can be arranged in a feedback or feed-forward control topology. Referring to an example feedback arrangement 32 in FIG. 3, a noise detection site 34 and an anti-noise injection site 36 are located along a noise propagation path (NPP) 19 between the OS 18 and the receiver system 4. For illustrative purposes, the noise detection site 34 and the anti-noise injection site 36 are shown as separate sites. However, it is possible that they can be the same, for instance the vehicle body 12 can serve as both a noise detection site and a noise injection site by sensing and modifying its potential with respect to earth. The NPP 19 can include all components between the OS 18 and the receiver system 4 that facilitate the conduction and propagation of a noise voltage. For example, the NPP 19 can include the NCP 20, the NR 22, and the vehicle body 12.

The noise detection site 34 represents the site at which a noise voltage N is sensed by the NCS 16, and the anti-noise injection site 36 represents the site at which an anti-noise signal AN is driven or applied. Noise sensing can be performed at various sites. Consistent with a feedback approach, the noise detection site 34 is closer to the receiver system 4, i.e. farther along the NPP 19, while the anti-noise injection site is closer to the originating source 18. Accordingly, the voltage detected at the detection site 34 includes the effects of the injected anti-noise signal. By way of example, the noise detection site 34 can be at the NPS 10, for example at the NS 21 or the NR 22, or at the vehicle body 12. While it is also possible that a noise detection site can be at the originating source 18, such an arrangement is typically less effective for inverter-produced shaft-coupled noise due to the variability in propagation through a vehicle transaxle. While a vehicle is moving, noise can propagate through a transaxle fairly well since a thin coat of oil on the transaxle and wheel bearings can render them unconductive. However, when a vehicle is stopped, the transaxle and wheel bearings can become conductive and shunt the noise voltage to ground, preventing its conduction to the wheels and its coupling to the vehicle body. Thus, an NCS configured to detect a shaft-coupled noise voltage at an originating source may provide an undesired anti-noise output. Accordingly, it has been found that a more effective noise cancellation arrangement for shaft-coupled noise is to provide a noise detection site at a location other than at an originating noise source, and preferably past a vehicle transaxle. Coupling an AN waveform to a vehicle can also be performed at various sites. In a feedback arrangement, the anti-noise injection site 36 is closer to the OS 18 and not as far along the NPP 19 as the noise detection site 34.

Table 1 below provides a non-limiting list of example noise sensing locations and definitions, and Table 2 provides a non-limiting list of example anti-noise injection locations and definitions. As can be observed from Tables 1 and 2, a vehicle component, structure, or apparatus, such as a vehicle half-shaft or wheel, can function as both a noise sensing location and an anti-noise injection location. While a noise radiator is typically part of the standard vehicle structure, an anti-noise radiator can an additional component added as part of an NCS.

TABLE 1

Sensing Location Definitions

| Noise Sensing Location | Description |
| --- | --- |
| Noise Source | Entity having a noise voltage that is transmitted to the noise radiator. For HEV shaft-coupled interference, power electronics inverter is typically the originating source. Any non-radiating component along a conduction path from the inverter to the noise radiator shall be categorized as part of the source. |
| Noise Radiator | A vehicle structure having structure-to-body noise voltage or structure current which produces the vehicle antenna noise response, for example half-shafts and wheels. |
| Body | The sensing location is the Body if the sensor picks up the vehicle body field, e.g. using an antenna under the body, away from the noise radiator. |

TABLE 2

Anti-Noise Injection Location Definitions

| Anti-Noise Injection Location | Description |
| --- | --- |
| Noise Source | Entity having a noise voltage that is transmitted to the noise radiator. For HEV shaft-coupled interference, power electronics inverter is typically the originating source. Any non-radiating component along a conduction path from the inverter to the radiator shall be categorized as part of the source. |
| Noise Radiator | A vehicle structure having structure-to-body noise voltage or structure current which produces the vehicle antenna noise response, for example half-shafts and wheels. |
| Anti-Noise Radiator | A structure which can be artificially driven with the sensed noise voltage times a gain factor to produce an inverted noise signal at a vehicle antenna. |
| Receiver System | Actual injection location could be anywhere in the receiving system, for example at a tuner, an antenna or an antenna cable. |

For illustrative purposes the discussion herein is directed to the invention's application in cancelling shaft-coupled RF noise; Table 3 below provides a chart of the embodiments that will be described. However, it is noted that Table 3 is merely illustrative and not exhaustive of the various embodiments in which the invention can be practiced. By way of example, a noise source can also serve as a noise sensing and/or anti-noise injection site. It is contemplated that one skilled in the art will understand how to implement additional embodiments that incorporate other combinations of noise sensing and anti-noise injection locations.

TABLE 3

Embodiment Combinations of Sensing and Injection Locations

Figures 4A, 4B:
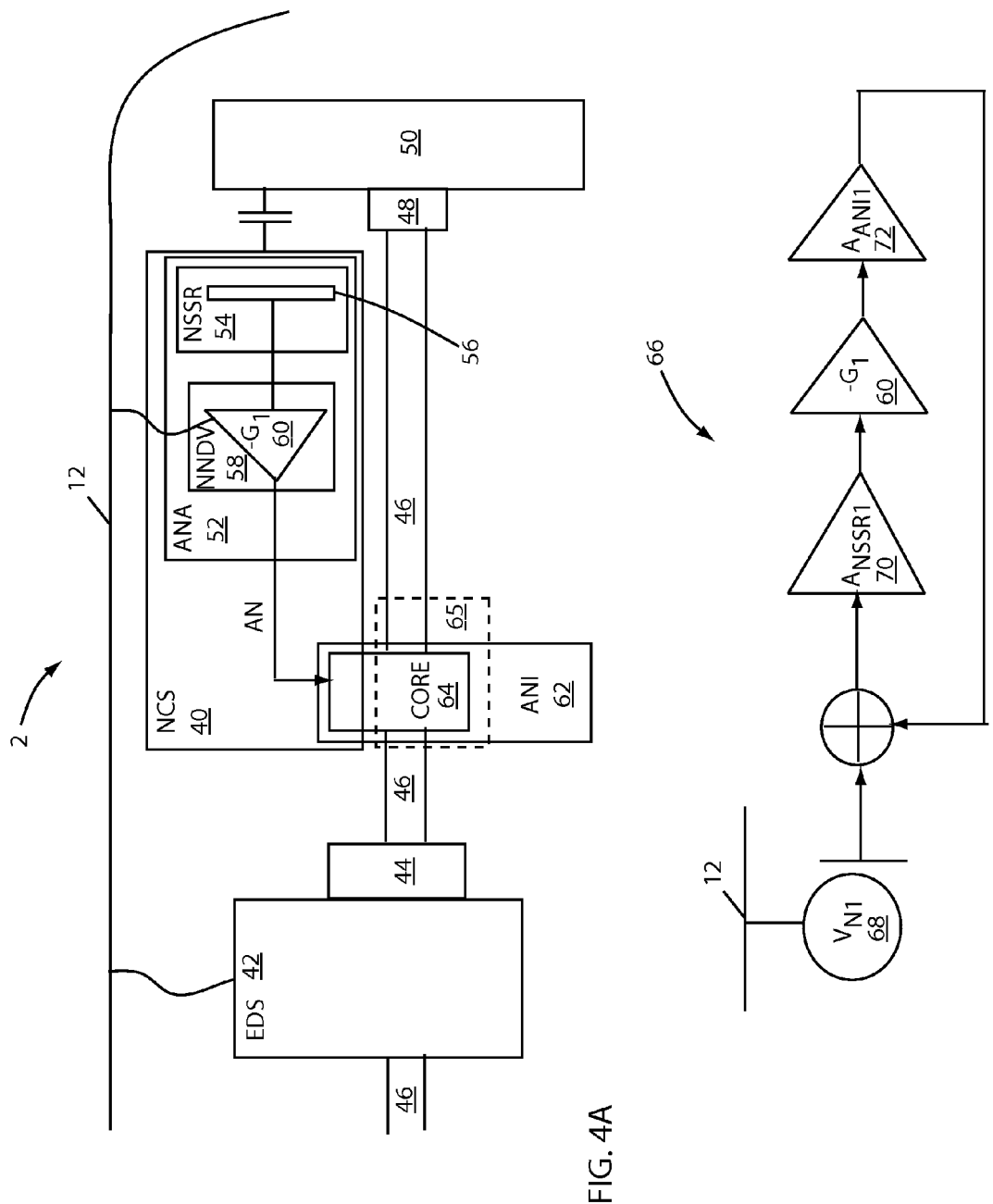
FIG. 4A shows an example feedback noise cancellation system.
FIG. 4B shows an equivalent circuit for the feedback system of FIG. 4A.
Figure 5A:
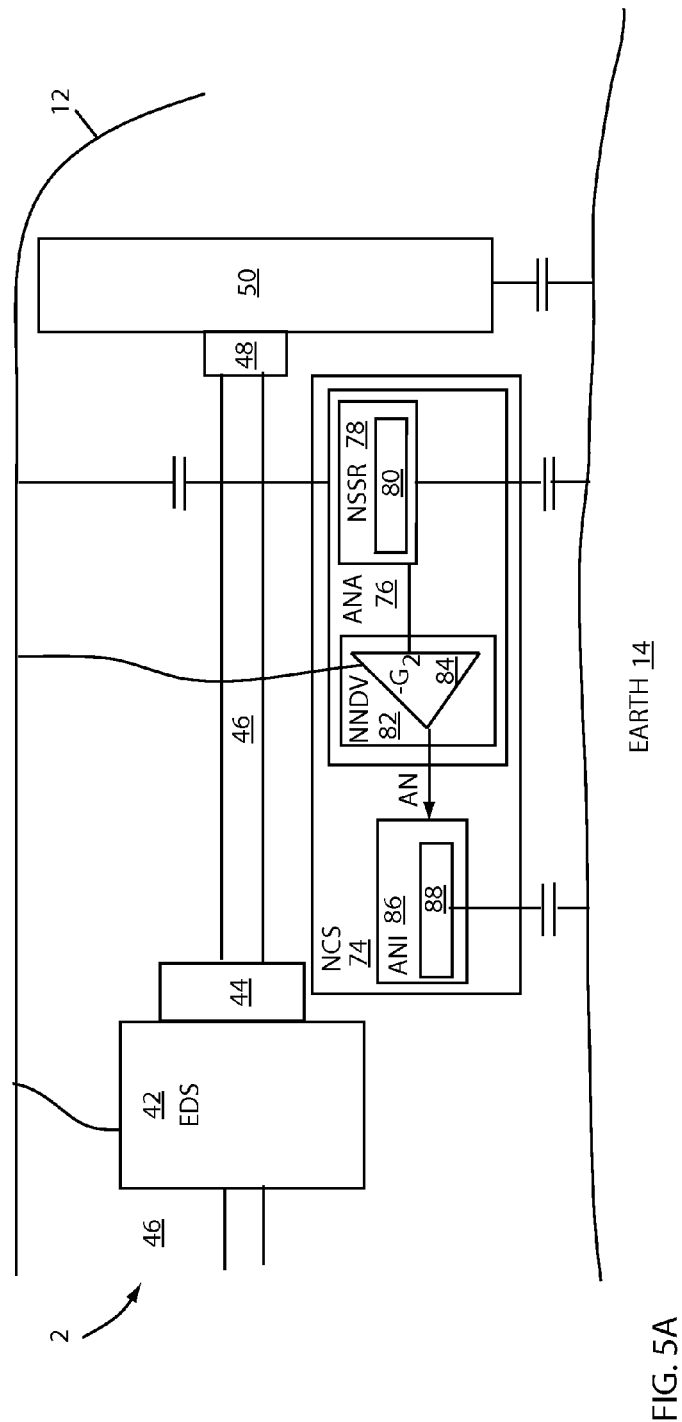
FIG. 5A shows an example feedback noise cancellation system.
Figure 5B:
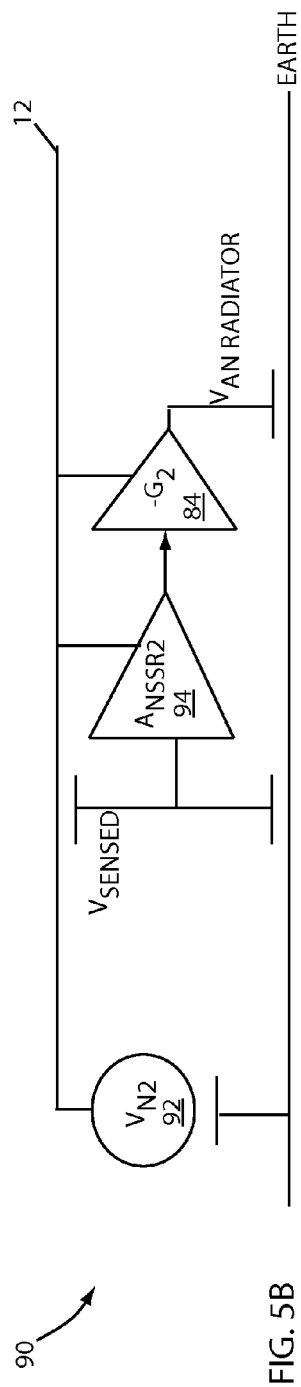
FIG. 5B shows an equivalent circuit for the feedback system of FIG. 5A.
Figure 9:
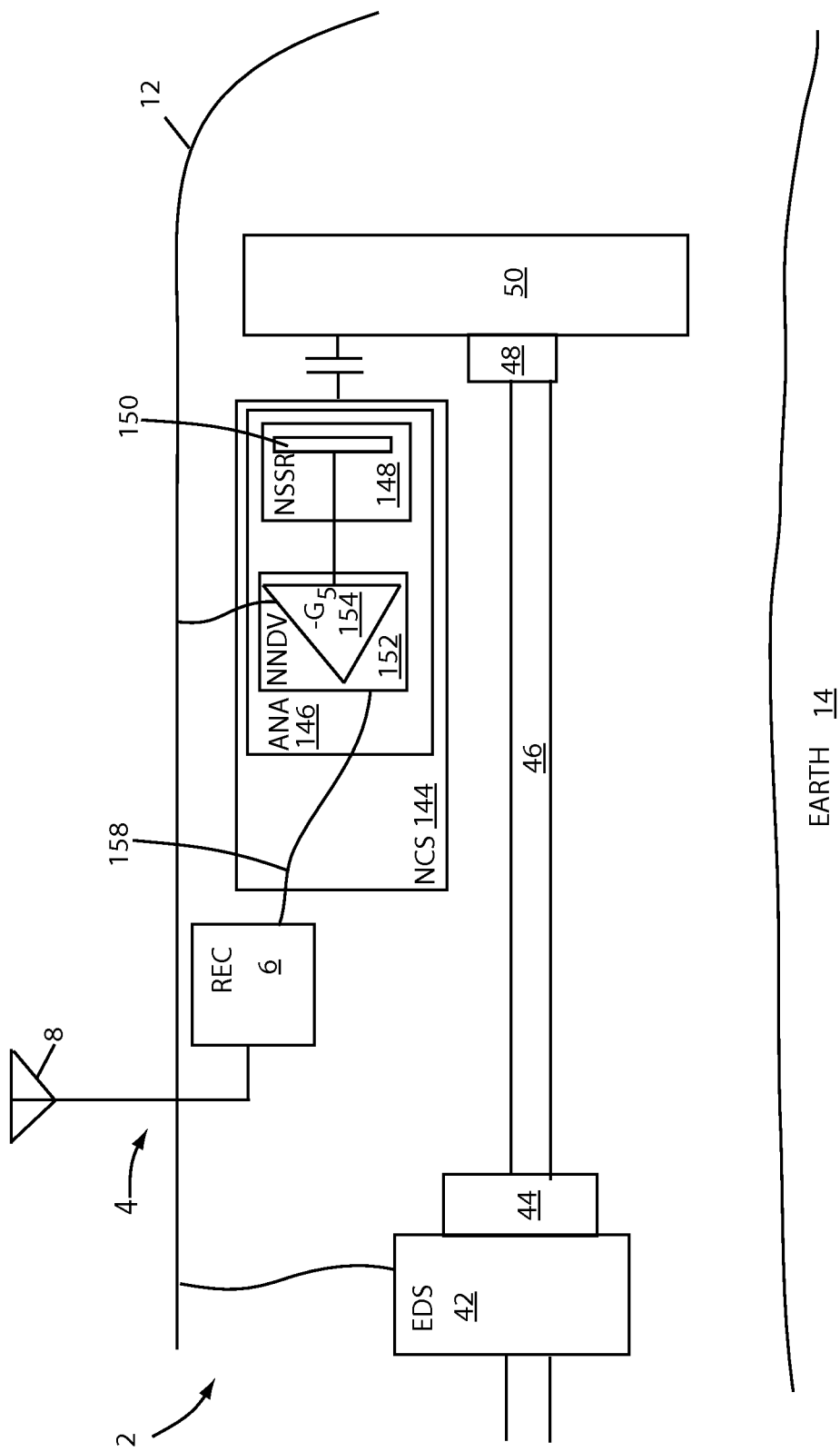
FIG. 9 depicts an example feed-forward noise cancellation system.
Figure 10:
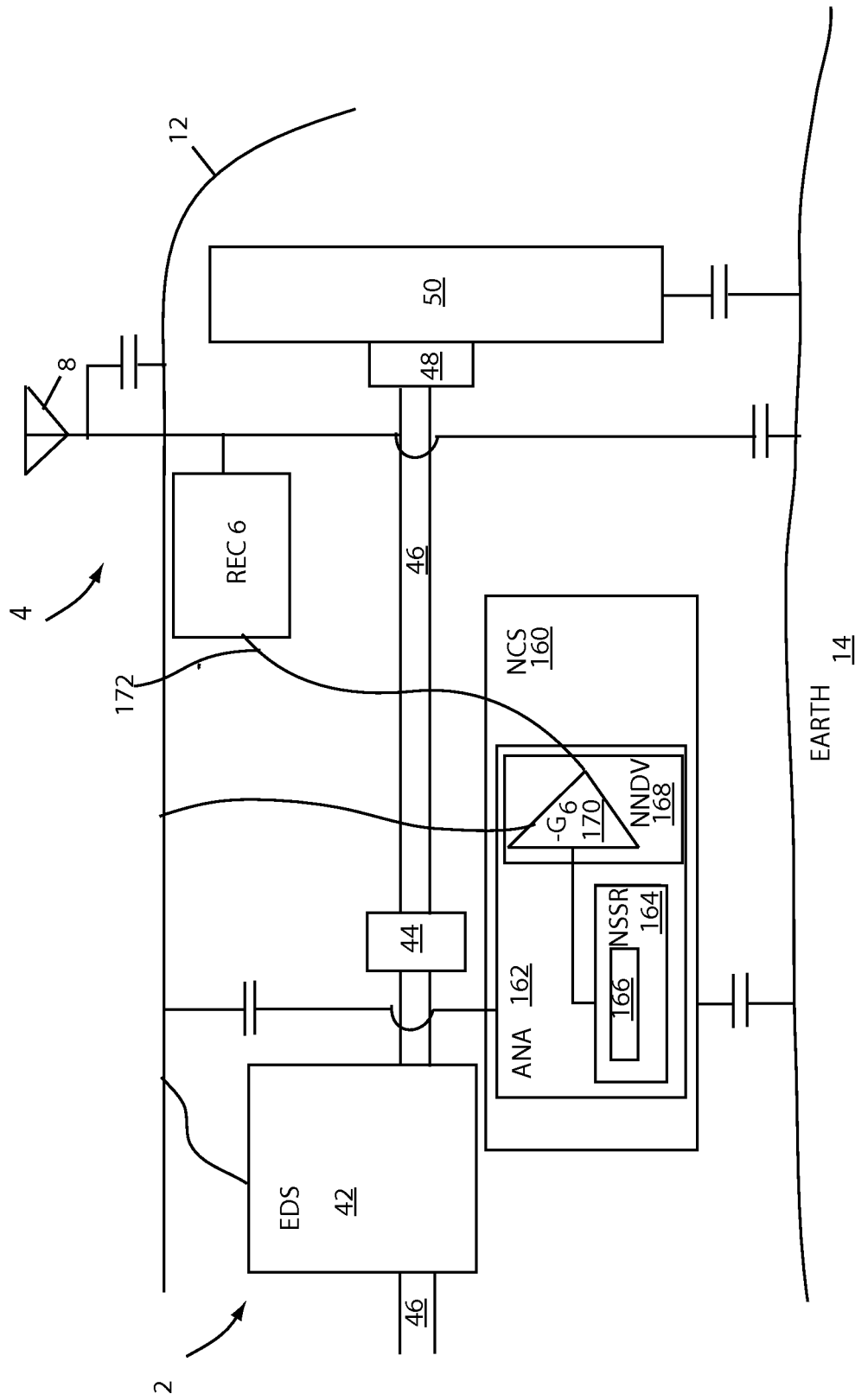
FIG. 10 shows an example feed-forward noise cancellation system.

| | | Noise Sensing Location | |
| --- | --- | --- | --- |
| | | Noise Radiator | Body |
| Anti-Noise Injection Location | Noise Radiator | FIGS. 4A, 4B 7A, 7B | |
| | Anti-Noise Radiator | FIGS. 8A, 8B | FIGS. 5A, 5B |
| | Receiver System | FIG. 9 | FIG. 10 |

FIG. 4A shows an example NCS 40 in a feedback control topology in which both noise sensing and anti-noise injection is performed at a noise radiator. The NCS 40 is implemented at the EV 2 having an electric drive system (EDS) 42 grounded to the vehicle body 12, a CV joint 44, a half-shaft 46, a wheel bearing assembly 48, and a wheel 50. Both the half-shaft 46 and the wheel 50 can operate as a noise radiator for shaft-coupled noise. The NCS 40 includes an ANA 52 coupled to an ANI 62. The ANA 52 comprises an NSSR 54 coupled to an NNDV 58. The NSSR 54 is configured to sense a voltage at a noise detection site which, in this case, is the wheel 50. In this example, the NSSR 54 is configured to detect a noise radiator-to-body voltage or "noise radiator voltage". Because the NSSR 54 is configured to detect noise at a rotating device, for best results it is embodied as a passive capacitive sensor. In an example embodiment, the NSSR 54 can comprise a conductive disk 56 positioned near the wheel 50 as shown in FIG. 4A, or near the CV joint 44. By way of example, the disk 56 can be composed of metal, or covered with a metallic material, such as a metallic foil.

The NSSR 54 can comprise a capacitance divider since it can have capacitance to the wheel 50 as well as to the vehicle body 12. Under the assumption that significant losses or resistances are compensated for, the voltage at the disk 56 will be some fraction of the wheel 50 voltage and will have the same phase. In an alternative embodiment, a noise detection site can be at the half-shaft 46 rather than the wheel 50, and an NSSR can be in the form of a conductive sleeve positioned around the half-shaft 46 configured to capacitively couple a noise voltage to the NNDV 58. By way of example, a conductive sleeve can be positioned near the CV joint 44 of the EV 2.

In the example of FIG. 4A, the NNDV 58 comprises an amplifier 60 having a gain $-G_1$, the negative sign indicating that it is configured to invert its input to provide an anti-noise output. When used with a capacitive noise detector, which typically has a low capacitance on the order of 1-30 pF, it is preferable that amplifier 60 has a high input impedance to avoid having to compensate for a large sensor loss at the NSSR 54. By way of example, the amplifier 60 can be in the form of a buffer or other high impedance amplifier. It may optimally be co-located with the sensor.

The ANI 62 is configured to receive the anti-noise output AN from the NNDV 58 and couple it to the EV 2. The anti-noise injection site for the NCS 40 is at the half-shaft 46 at a position that is closer to the EDS 42 than to the wheel 50. Because the anti-noise injection site rotates, it is preferable to use magnetic coupling to inject an anti-noise signal. Accordingly, the ANI 62 can be embodied as an inductive coupler configured to magnetically couple the NNDV 58 anti-noise output AN to the half-shaft 46. By way of example, the ANI 62 can comprise a ferrite core 64, through which the half-shaft 46 can pass, so that the combination of the core 64 and the half-shaft 46 form a transformer 65 in which the primary winding is the core 60 and the secondary winding is the half-shaft 46. Because the NCS 40 is arranged for feedback control, the NNDV 58 can be configured to drive the voltage at the wheel 50, which represents the sum of noise and anti-noise, to nearly zero, without trying to provide an anti-noise signal having an amplitude that matches that of the detected noise signal. In a preferred embodiment, the gain magnitude $G_1$ is much greater than 1.

FIG. 4B shows an equivalent circuit 66 for the feedback arrangement of FIG. 4A, showing the gains of various circuit elements. The circuit 66 includes the voltage source 68 representing a noise conduction element, in this case the half shaft 46 operating as a noise source and having voltage $V_{N1}$ with respect to the vehicle body 12, a noise radiator, in this case the wheel 50, having a voltage $V_{WHEEL}$, an amplifier 70 representing the NSSR 54 and having a gain $A_{NSSR1}$, the NNDV amplifier 60 having the gain $-G_1$, and an amplifier 72 representing the ANI 62 having a gain $A_{ANI1}$. It is contemplated that the noise radiator function of the half-shaft 46 may also be considered when evaluating the desired gains of the amplifiers 60, 70 and 72. When the ANI 62 is embodied as a ferrite core, the gain $A_{ANI1}$ represents the gain of the transformer 65 formed by the combination of the core 64 and the half-shaft 46. Based on the circuit 66 configuration, it has been found that a desirable value for the gain $A_1$ of the NCS 40 can be expressed as:

$$\left|\frac{1}{1-A_1}\right| \le CF_1 \quad (1)$$

where
$CF_1$ is a desired cancellation ratio,
$A_1=(A_{NSSR1})(A_{ANI1})(-G_1)$

In an example embodiment, $CF_1$ is the ratio of a noise voltage at the wheel 50 before and after cancellation. If a noise voltage received at a radio receiver system is entirely attributable to a noise voltage present at the wheel 50, $CF_1$ can also be understood as the ratio of the voltage received at a radio receiver system with noise cancellation, to the voltage received at a radio receiver system without noise cancellation. By way of example, for a $CF_1$ of −20 dB, the magnitude of $A_1$ should be greater than 19.1 dB.

FIG. 5A shows an example NCS 74 in a feedback arrangement in which a noise detection site is the vehicle body 12, and an anti-noise radiator is configured drive an anti-noise output to null a vehicle-to-earth potential difference. Referring back to FIG. 1, the antenna 8 of the radio receiver system 4 can detect the difference in electric field between its ground, typically the vehicle body 12, and the surrounding environment. When a noise voltage propagates through the EDS 42 and is coupled to the vehicle body 12, charging it, the antenna 8 will detect the difference in potential between the body 12 and the earth potential 14. In the arrangement of FIG. 5A, the NCS 74 is configured to drive that difference to zero to eliminate interference at the radio system 4. The NCS 74 includes an ANA 76 configured to provide an anti-noise signal to an ANI 86. The ANA 76 comprises an NSSR 78 coupled to an NNDV 82. In this example embodiment, the NSSR 78 is in the form of a capacitive sensor configured to detect the vehicle body 12 potential relative to the earth 14. In an example embodiment, the ANA 76 is grounded to the vehicle body 12, and the NSSR 78 can be configured to sense the earth potential 14 to determine the difference in potential between the earth potential 14 and the vehicle body 12. By way of example, the NSSR 78 capacitive sensor can comprise a conductive disk 80 positioned underneath the vehicle 2. The NSSR 78 can be configured to provide an output to the NNDV 82, which can comprise an amplifier 84 grounded to the vehicle body 12 and having a gain $-G_2$. The amplifier 84 is configured to provide a noise cancellation output to the ANI 86, an anti-noise radiator configured to drive the potential difference between the body 12 and the earth 14 to zero. By way of example, the ANI 86 can comprise a metallic disk 88 or a foil-covered plastic or non-metallic surface. It can be positioned a sufficient distance from the NSSR 78 to provide electrical isolation between the capacitive sensor and injector.

Capacitance symbols depicted in FIG. 5A (as well as those used in subsequent drawings presented herein) are used to indicate that a difference in electrical charge can exist between elements connected by the capacitor symbol. However, they are not to be understood as quantifying the difference; nor does the use of the same capacitance symbol in association with various elements indicate the same amount of capacitance. The capacitances depicted may not include all capacitances present, as capacitances, such as stray capacitances, may be omitted from the drawing to better emphasize aspects of the invention.

FIG. 5B shows an equivalent circuit 90 for the FIG. 5A embodiment. The circuit 90 includes a voltage source 92 representing the noise radiator, in this case the wheel 50, having a voltage $V_{N2}$, an amplifier 94 representing the NSSR 78 and having a gain $A_{NSSR2}$, and the amplifier 84 having a gain $-G_2$. As can be seen from FIGS. 5A, 5B, the existence a capacitance between the wheel 50 and the earth potential 14 enables the wheel 50 to perform as a noise radiator that drives a body-to-earth (or earth-to-body) voltage that can be countered by the NCS 74. The NSSR 78 can sense the difference between the earth potential 14 and the vehicle body 12. Output from the ANI 86, represented in FIG. 5B as $V_{AN}$, can be configured to null the earth-to-body voltage sensed by the NSSR 78. Because the NSSR 78 is in the form of a capacitive sensor that may have capacitance to both earth 14 and vehicle body 12, its sensed voltage may be less than the actual earth-to-body 12 voltage. As a result, that loss may need to be considered in determining the desired gain magnitude for the amplifier 84. Considering the various capacitances, admittances and gains of the NCS 74, the assumption that the unloaded NSSR 78 capacitive sensor output is less than the body 12 voltage, and the assumption that the anti-noise voltage induced on the vehicle body 12 is less than the NNDV 82 amplifier 84 output voltage, it is anticipated that the required voltage gain $A_2$ of the NCS 74 will typically be higher than that of the NCS 40 of the previous feedback arrangement, and that the amplifier 84 current output will be lower than that of the amplifier 60 since the amplifier 84 load is a capacitive anti-noise radiator.

Figure 6:
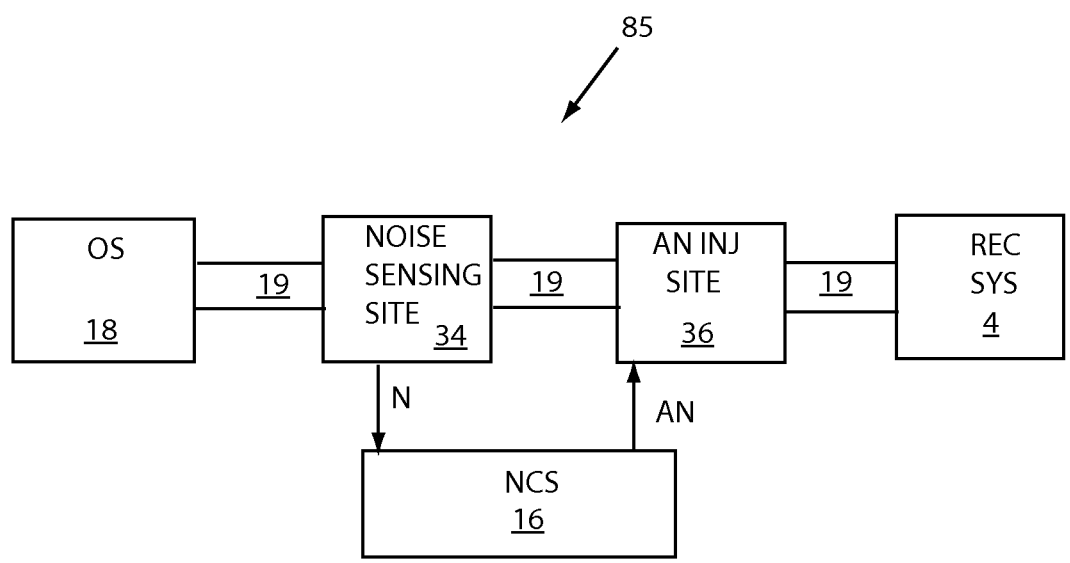
FIG. 6 shows an example feed forward topology for a noise cancellation system.

FIG. 6 shows an example configuration 85 of the NCS 16 in a feed-forward arrangement in which the noise sensing site 34 is located closer to the OS 18, while the anti-noise injection site 36 is positioned farther along the NPP 19, and closer to the receiver system 6. An example implementation of a feed-forward arrangement is illustrated by an NCS 96 depicted in FIG. 7A. In this arrangement, the noise sensing location is at an element of the noise source propagation path, or a first noise radiator, and anti-noise is injected in the path between the sensing location and a second or subsequent noise radiator positioned further along the noise propagation path. In the example embodiment of FIG. 7A, the half-shaft 46 functions as a (minor) first noise radiator and as a noise sensing site, and anti-noise AN is injected between the first noise radiator and a second noise radiator, in this case the wheel 50. Consistent with a feed forward topology, an ANA 98 comprises an NSSR 100 configured to sense a noise voltage at the half-shaft 46 proximate the EDS 42, and an NNDV 104 configured to provide an anti-noise output AN for series injection on the half-shaft 46 farther along a noise propagation path from a noise source to a radio receiver system. The NSSR 100 is embodied as a capacitive sensor comprising a conductive disk 102, and is configured to provide a detected noise voltage to the NNDV 104. In an example embodiment, the NSSR 100 can be embodied as a conductive tube positioned around the half-shaft 46 or the CV joint 44. By way of example, the NNDV 104 can comprise an amplifier 106 having a gain $-G_3$. An ANI 108, embodied here as an inductive coupler, is configured to receive the anti-noise output AN from the amplifier 106 and couple it to the half-shaft 46. By way of example, the ANI 108 can comprise a ferrite core 110 configured to receive the half-shaft 46.

Figure 7A:
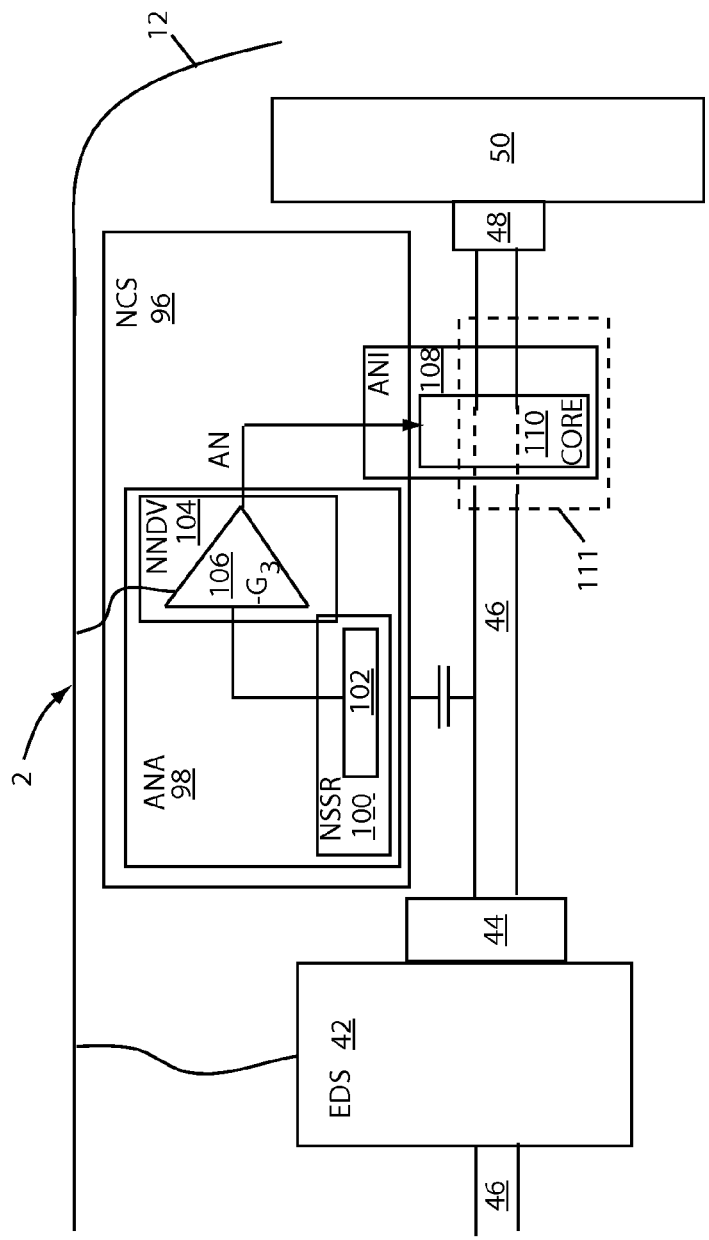
FIG. 7A shows an example feed-forward noise cancellation system.
Figure 7B:
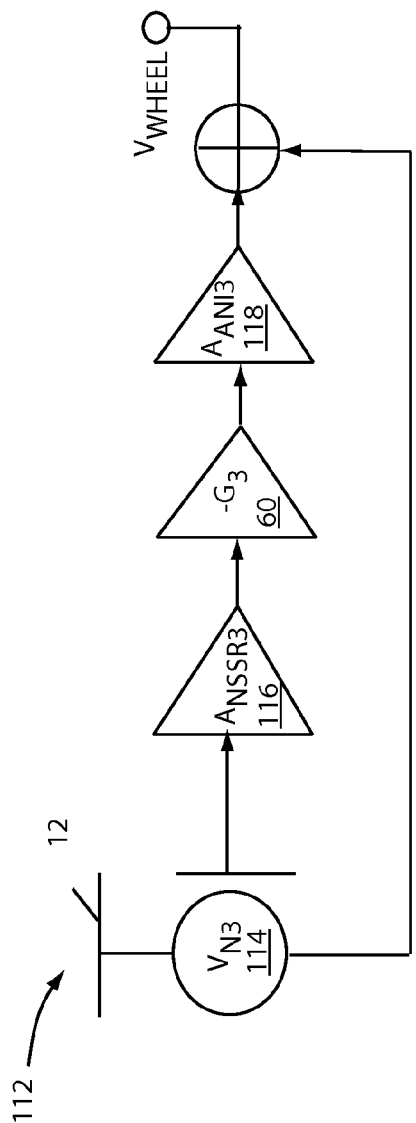
FIG. 7B shows an example circuit for the feed-forward system of FIG. 8A.

In the feed-forward arrangement of FIG. 7A, it is desired that a cancellation waveform have the same amplitude as a noise voltage, with an opposite polarity, in order to eliminate interference at a receiver system. FIG. 7B shows an equivalent circuit 112 for the NCS 96. The voltage source 114 represents the half-shaft 46 functioning as a noise radiator with voltage $V_{N3}$. An amplifier 116 having a gain $A_{NSSR3}$ represents the NSSR 100, and an amplifier 118 having a gain $A_{ANI3}$ represents the ANI 108 that has a gain that can be expressed as the gain of a transformer 111 formed by the core 110 and half-shaft 46. In a preferred embodiment, the overall gain $A_3$ of the NCS 96 system, should equal $-1$ for optimal noise cancellation, By way of example, $A_3$ can be expressed as:

$$A_3 = (NNDV_3)(-G_3)(A_{T3}).$$

FIG. 8A shows a further embodiment of an NCS in a feed-forward topology. In this arrangement, noise sensing is performed at a noise radiator, and anti-noise injection is at an anti-noise radiator. An NCS 120 includes an ANA 122 that includes a NSSR 124 and an NNDV 128. In this example, the NSSR 124 is in the form of a capacitive sensor, comprising a conductive disk 126, and configured to detect the voltage at the wheel 50, but NSSR capacitances (not shown) to vehicle body 12 and earth potential 14 may also be present. The NSSR 124 is configured to provide a sensed voltage to the NNDV 128, which comprises an amplifier 130 having a voltage gain of $-G_4$. It is understood that the NNDV 128 input can have capacitances (not shown) to the vehicle body 12 and the earth 14, which, preferably, are considered when determining a desired value for the magnitude of $G_4$. The NNDV 128 is configured to provide a noise cancellation voltage to an ANI 132, embodied here in the form of a capacitive coupler that operates as an anti-noise radiator. The ANI 132 can comprise a metallic, or metallic-coated disk 134 having capacitance to the earth 14.

FIG. 8B depicts an equivalent circuit 136 for the NCS 120, showing a voltage source 138 with voltage $V_{N4}$ that represents the wheel 50 functioning as a noise radiator, and an amplifier 140 with gain $A_{NSSR4}$ representing the capacitive NSSR 124. As can be seen from FIGS. 8A-8B, current through a capacitance that exists between the noise radiator, here the wheel 50 represented by $V_{N4}$, and the earth potential 14, can be canceled by current through a $VA_N$ radiator capacitor, for example, the disk 134. Through this cancellation effect, the feedforward arrangement of the NCS 120 can prevent excitation of a body-to-earth potential.

FIG. 9 shows an example feed-forward arrangement in which a noise detection site is a noise radiator, and an anti-noise injection site is a receiver. An NCS 144 comprises an ANA 146 that includes an NSSR 148 and an NNDV 152. The NSSR 148 is embodied as a capacitive sensor comprising a conductive disk 150 for sensing a voltage at the wheel 50, a noise radiator. The NNDV 152 comprises an amplifier 154 having a gain $-G_5$ and is configured to provide an anti-noise output to cancel noise at the receiver system 4. In this embodiment, a sensed noise radiator voltage can be inverted to provide an anti-noise output that is provided directly to the radio receiver system 4 by the cable 158 for noise cancellation. Given the NCS 144 direct feed to the radio receiver system 4, the magnitude of the amplifier 154 gain $G_5$ can be small compared to other embodiments.

FIG. 10 shows a further example of a feed-forward arrangement in which an anti-noise output is directly coupled to a receiver system. In the exemplary embodiment of FIG. 10, a noise detection site is a vehicle body, and an anti-noise injection site is a receiver system. An NCS 160 comprises an ANA 162 having an NSSR 164 coupled to an NNDV 168. In this example, the NSSR 164 is in the form of a capacitive sensor configured to sense vehicle body 12 voltage with respect to the earth 14 and provide it to the NNDV 168. By way of example, the NSSR 164 can comprise a conductive disk 166. The NNDV 168 can comprise an amplifier 170 having a gain –$G_6$, and can be configured to provide an anti-noise signal to the receiver system 4 via the cable 172.

Figure 11A:
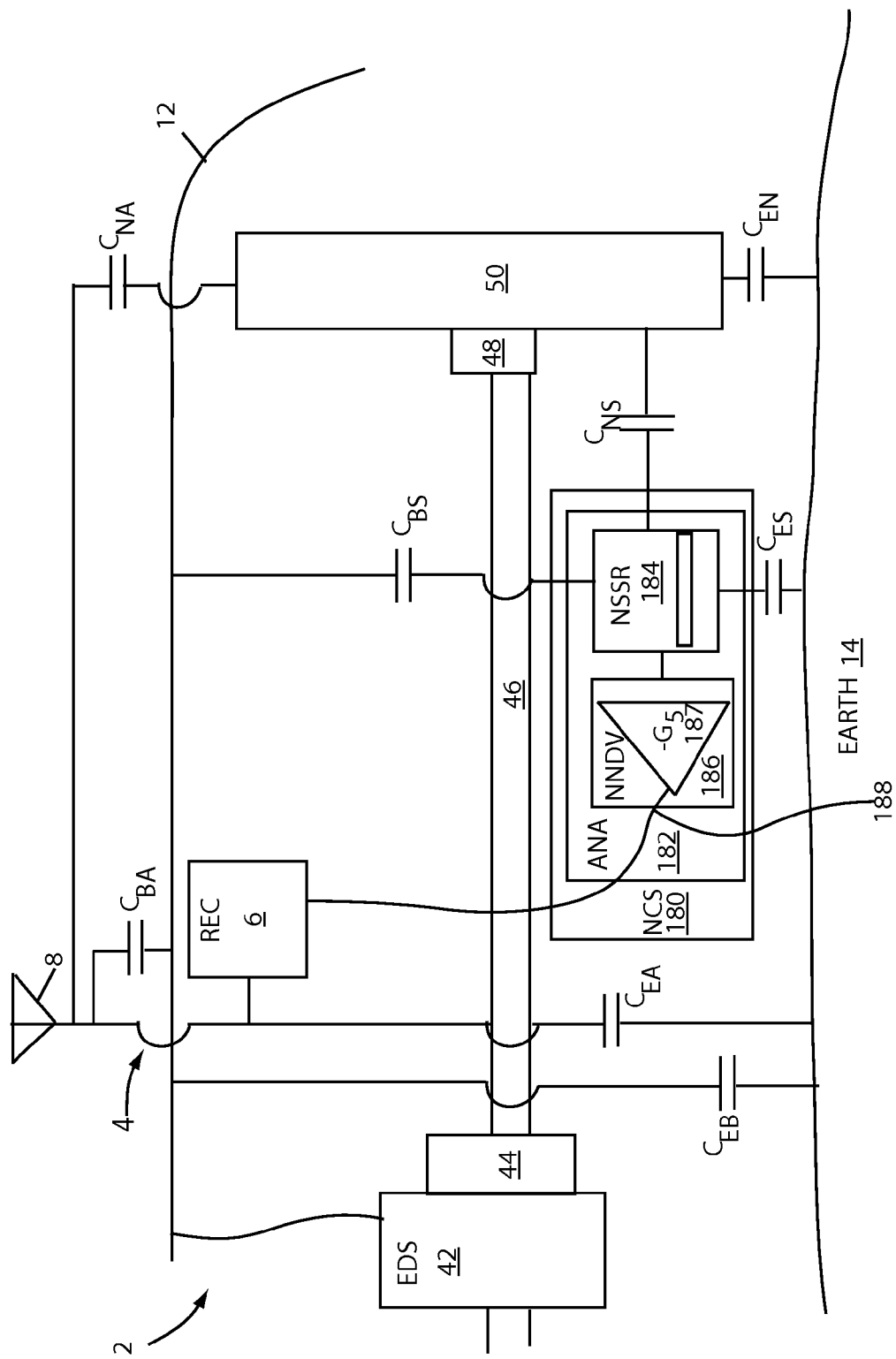
FIG. 11A shows an example feed-forward noise cancellation system.

FIG. 11A depicts an NCS 180 that combines features of the NCS 144 and 160 of FIGS. 9 and 10, and depicts and identifies the various capacitances that can exist between elements of the EV2 and the NCS 180, as well as between the earth 14 and components of the EV2 and the NCS 180. The NCS 180 includes an ANA 182 that comprises a noise sensor NSSR 184 coupled to an anti-noise device NNDV 186. As described above in reference to FIGS. 9 and 10, in an example embodiment, the NSSR 184 can comprise a metal disk or foil-covered non-metal disk or plate. A noise voltage sensed by the NSSR 184 can be provided to the NNDV 186 which can be configured to invert the noise voltage and apply a predetermined gain, as indicated by an amplifier 187 having a gain –$G_5$, to provide an anti-noise waveform. The anti-noise waveform can be provided to the radio receiver system 4 via a cable 188. Various capacitances are depicted: $C_{BA}$ represents capacitance between the vehicle body 12 and the antenna 8, $C_{EB}$ represents a capacitance between the earth 14 and the vehicle body 12, $C_{EA}$ represents a capacitance between the earth 14 and the antenna 8, $C_{BS}$ denotes a capacitance between the vehicle body 12 and the sensor NSSR 184, $C_{ES}$ represents a capacitance between the earth 14 and the sensor NSSR 184, $C_{NS}$ denotes a capacitance between the noise radiator, in this case the wheel 50, and the sensor NSSR 184, $C_{EN}$ represents a capacitance between the earth 14 and the noise radiator wheel 50, and $C_{AN}$ represents the capacitance between the antenna 8 and the noise radiator, wheel 50.

Figure 11B:
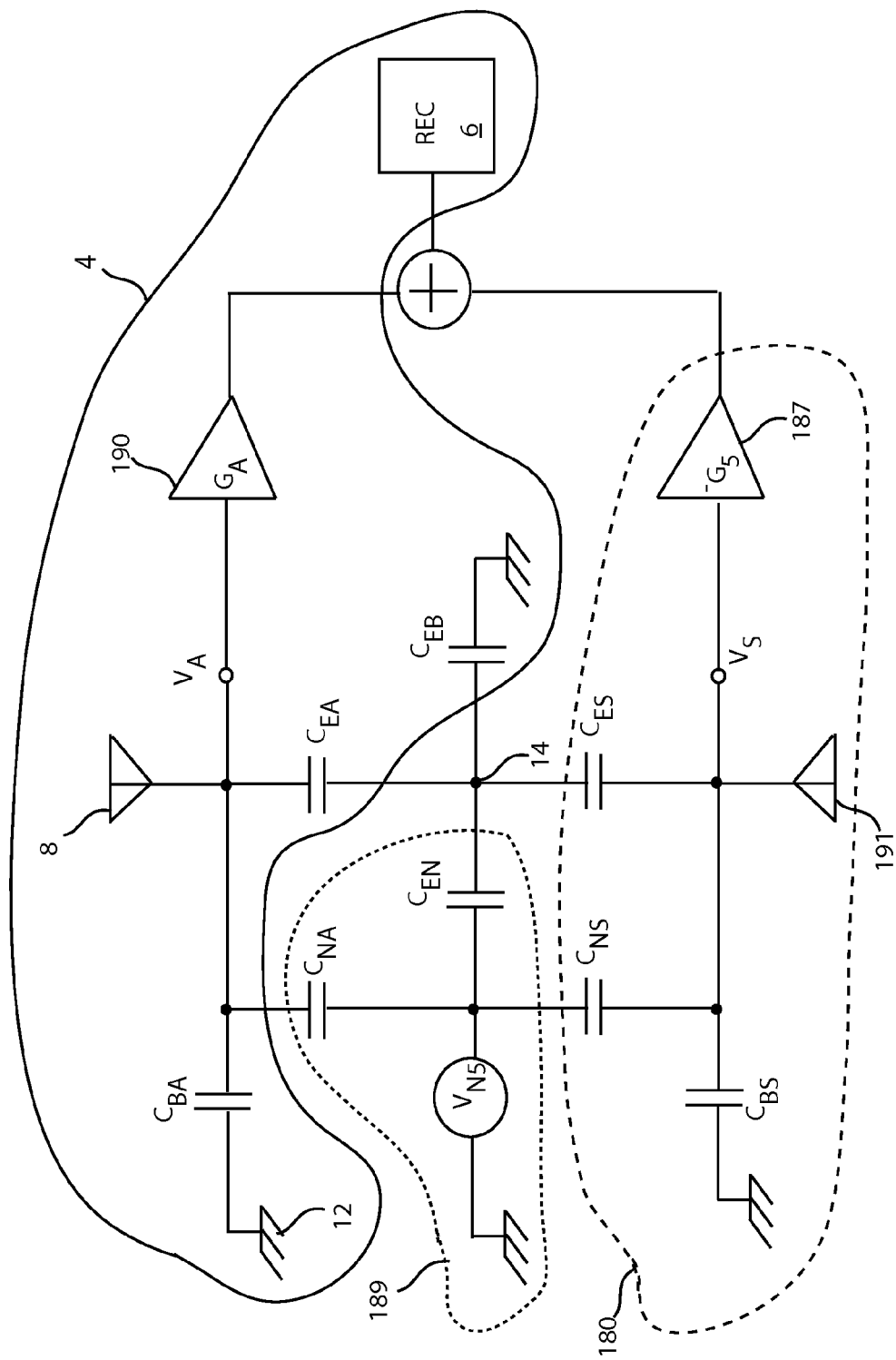
FIG. 11B shows an example circuit for the feed-forward system of FIG. 11A.

FIG. 11B shows an equivalent circuit of the FIG. 11A arrangement that includes a noise conduction portion 189, the NCS 180, and the receiver system 4. A voltage source $V_{N5}$ represents a noise voltage from the noise radiator embodied as the wheel 50, and $V_S$ represents the voltage at the NSSR 184. In FIG. 11B, the node 14 represents the earth potential, and the grounds 12 represent the vehicle 2 body. $V_A$ represents a voltage at the antenna 8, with the gain of the antenna/receiver system represented by an amplifier 190 having a gain $G_A$. When direct noise coupling to the antenna 8 ($C_{NA}$) is small, $C_{ES}$ can be adjusted to null a body 12 voltage caused by $C_{EN}$, and the NCS 180 can behave like a balanced antenna (indicated by the pairing of the antenna 8 with a constructive opposing antenna 191), by removing the influence of the body-to-earth potential difference. However, generally, various forms of direct ($C_{NA}$) and indirect noise coupling ($C_{EN}$, $C_{EA}$, $C_{EB}$) can be present. Accordingly, a spectrum of sensing capacitor pairs ($C_{NS}$, $C_{ES}$) can be used to achieve a net noise nulling effect. However, it is not always necessary to implement both $C_{NS}$ (e.g., for cancellation of $C_{AN}$), and $C_{ES}$ (e.g., for cancellation of $C_{EA}$). Often it is possible to cancel the net effect of both $C_{AN}$ and $C_{EA}$ with a particular choice of either $C_{NS}$ or $C_{ES}$.

Figure 12:
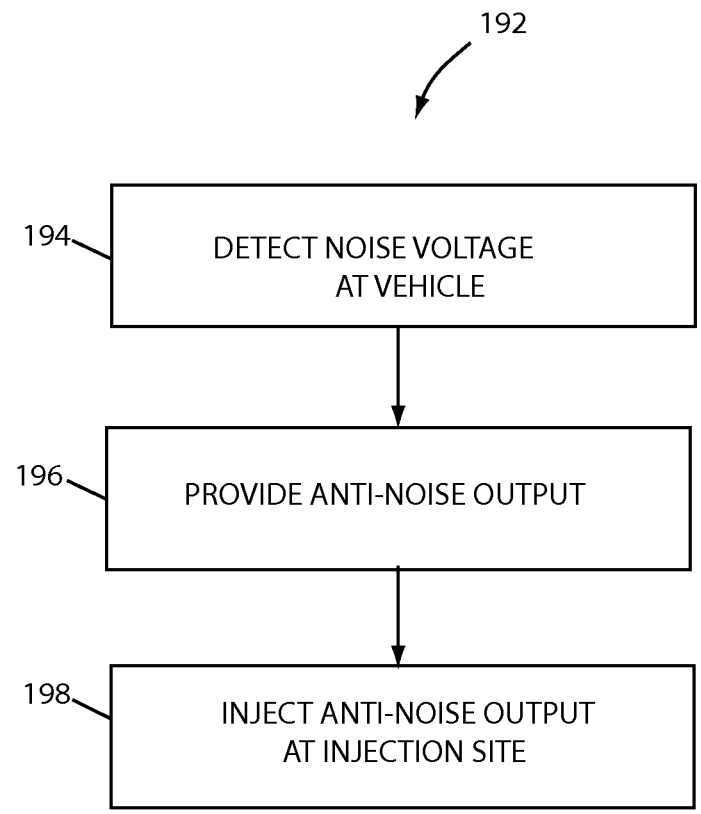
FIG. 12 shows a flow diagram of an example method of the invention.

FIG. 12 shows an example method 192 for cancelling a noise voltage at a vehicle. At block 194 a noise voltage can be detected at a vehicle noise detection site. For example, referring to FIG. 4A the NSSR 54 can capacitively sense a noise voltage at the wheel 50 of the EV2. At block 196, an anti-noise output configured to null the noise voltage can be provided. For example, the NNDV 58 can provide a noise cancellation waveform output to the ANI 64. In an example embodiment, the NNDV 58 inverts a noise voltage received from the NSSR 54 and applies a predetermined gain for noise cancellation in a feedback or feedforward arrangement. At block 198, an anti-noise output can be driven at an anti-noise injection site at a vehicle. By way of example, the ANI 64 can inductively couple the anti-noise output received from the NNDV 58 to the half-shaft 46.

Thus, the invention provides systems and apparatus for canceling electric noise voltages to prevent interference at a receiver onboard a vehicle. Discussed herein primarily in the context of cancelling shaft-coupled RF noise induced on a vehicle body in order to prevent interference with AM radio reception, the invention is not limited to such applications. AM radio signals are generally in the 0.5 MHz-1.7 MHz range, but a system of the invention can be configured to cancel noise at frequencies orders of magnitude higher. For example, in military applications an NCS can be configured to cancel noise signals in the 100 MHz range in order to prevent interference with military communications. Nor is the invention limited to cancelling noise caused by an inverter of an electric drive system. Cancellation of types of electric noise at a vehicle, such as but not limited to, noise voltages caused by engine fuel injectors can also be addressed.

An example NCS can include an ANA comprising an NSSR configured to detect a noise voltage at a noise detection site, and an NNDV configured to provide an anti-noise, or noise-nulling voltage. An ANA can comprise passive and/or active devices. Both feedback and feedforward control topologies can be implemented. In an exemplary embodiment a noise voltage can be capacitively sensed by an NSSR, and inductively or capacitively driven by an ANI at an injection site. By way of example, but not limitation, an ANI can be in the form of an inductive coupler configured to magnetically couple an anti-noise output to a noise radiator, or a capacitive anti-noise radiator configured to radiate an anti-noise output to reduce the potential between the vehicle body and the earth. In alternative embodiments, an anti-noise or noise cancellation waveform can be provided directly to a receiver system by a cable.

The present invention provides a noise cancellation system for nulling a noise voltage. In contrast to noise cancellation systems that attempt to cancel noise signals at a receiver system, such as noise signals provided by an antenna or generated by receiver electronics, an NCS of the invention is configured to sense a noise voltage present at a vehicle structure or component that is not part of a radio receiver system. In the particular case of an electrified vehicle, power electronic devices can generate large noise voltages, a portion of which can propagate through an EV transaxle and appear externally on a half-shaft, wheels or other vehicle structures that have a capacitance to earth. These structures can radiate a noise voltage and cause a portion of the noise voltage to be induced on the body of a vehicle, resulting in an earth-to-body voltage that can be detected by a radio system antenna. An NCS can be configured to null an earth-to-body voltage to reduce or obviate its interference at a radio receiver system. In addition, an NCS can be configured to null a voltage between a noise radiator and an antenna. In other words, an NCS is not limited to nulling an earth-to-body voltage that can interfere with a receiver system, but can also be configured to null a directly coupled capacitance between a vehicle component or structure and an antenna. For example, an NCS can be configured to null the capacitance $C_{NA}$ in FIG. 11B.

While discussed herein in the context of nulling an earth-to-body voltage at a vehicle, the invention is not limited to vehicular applications. Rather, an NCS of the invention can be used to null a "body" voltage present at other types of platforms as well. For example, an NCS can be used to null a voltage present at a housing, a chassis, a spacecraft body or other space platform, or other type of structure, that can result when a voltage is coupled to the structure from a noise radiator. Thus, an NCS of the invention can be directed to nulling types of noise that prior art traditional noise cancellation systems either fail to address or fail to adequately counteract.

As required, illustrative embodiments have been disclosed herein, however the invention is not limited to the described embodiments. As will be appreciated by those skilled in the art, aspects of the invention can be variously embodied, for example, additional circuit components such as amplifiers, filters, etc. not specifically depicted in the drawings can be included to facilitate performance of the functions described herein. Methods are not limited to the particular sequence described herein and may add, delete or combine various steps or operations. While described in the context of vehicle applications to cancel RF noise, it is contemplated that the invention can be used to cancel other types of noise voltages as well. The invention encompasses all systems, apparatus and methods within the scope of the appended claims.

The invention claimed is:

1. A noise cancellation system, comprising:
   a noise sensor (NSSR) configured to sense a noise voltage;
   a noise-nulling device (NNDV) coupled to said NSSR and configured to provide an anti-noise output based on said sensed voltage;
   an anti-noise injector (ANI) configured to drive said anti-noise output at an anti-noise injection site; and
   wherein said system is configured to null an earth-to-body voltage.

2. The system of claim 1, wherein said earth-to-body voltage is present at a vehicle.

3. The system of claim 1, wherein said ANI comprises a capacitive coupler.

4. The system of claim 1, wherein said ANI comprises an inductive coupler.

5. The system of claim 1, wherein said ANI is configured to couple said anti-noise output to a receiver system.

6. The system of claim 1, wherein said ANI comprises an anti-noise radiator.

7. The system of claim 1, wherein said NNDV is configured to provide a feedback signal.

8. The system of claim 1, wherein said NNDV is configured to provide a feed-forward signal.

9. The system of claim 1, wherein said sensed voltage comprises a radio frequency (RF) noise signal.

10. The system of claim 1, wherein said NSSR is a capacitive sensor.

11. A method for noise cancellation, comprising:
    a noise sensor apparatus sensing a noise voltage present at a structure of a vehicle;
    a noise-nulling device providing an anti-noise output configured to null an earth-to-body voltage at said vehicle; and
    an anti-noise injector configured to drive said anti-noise output at an anti-noise injection site at said vehicle.

12. The method of claim 11, wherein said sensing said voltage comprises capacitively sensing said voltage.

13. The method of claim 11, wherein said sensing said voltage comprises sensing a radio frequency noise voltage.

14. The method of claim 11, wherein said sensing said voltage comprises sensing other than a radio frequency noise voltage.

15. The method of claim 11, wherein said providing an anti-noise output comprises providing said anti-noise output to an anti-noise radiator.

16. The method of claim 11, wherein said driving said anti-noise output comprises inductively coupling said anti-noise output at said injection site.

17. The method of claim 11, wherein said driving said anti-noise output comprises capacitively coupling said anti-noise output.

18. The method of claim 11, wherein said driving said anti-noise output comprises providing said anti-noise output to a receiver system.

* * * * *